United States Patent
Matsui

(10) Patent No.: US 11,144,255 B2
(45) Date of Patent: Oct. 12, 2021

(54) INFORMATION PROCESSING APPARATUS, NON-TRANSITORY COMPUTER READABLE MEDIUM STORING INFORMATION PROCESSING PROGRAM, AND INFORMATION PROCESSING METHOD

(71) Applicant: FUJIFILM Business Innovation Corp., Tokyo (JP)

(72) Inventor: Takao Matsui, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 241 days.

(21) Appl. No.: 16/186,602

(22) Filed: Nov. 12, 2018

(65) Prior Publication Data

US 2019/0155553 A1    May 23, 2019

(30) Foreign Application Priority Data

Nov. 22, 2017    (JP) .............................. JP2017-224545

(51) Int. Cl.
*G06F 3/12* (2006.01)

(52) U.S. Cl.
CPC .......... *G06F 3/1205* (2013.01); *G06F 3/1253* (2013.01); *G06F 3/1275* (2013.01); *G06F 3/1285* (2013.01)

(58) Field of Classification Search
CPC .... G06F 3/1205; G06F 3/1285; G06F 3/1253; G06F 3/1275
USPC ....................................................... 358/1.13
See application file for complete search history.

(56) References Cited

U.S. PATENT DOCUMENTS

| 8,368,922 | B2 | 2/2013 | Maeda |
| 8,582,147 | B2 | 11/2013 | Sato |
| 8,619,307 | B2 | 12/2013 | Maeda |
| 8,730,498 | B2 | 5/2014 | Mori |
| 8,848,218 | B2 * | 9/2014 | Kishida .............. H04N 1/32112 358/1.15 |
| 2009/0103128 | A1 | 4/2009 | Maeda |
| 2010/0014115 | A1 * | 1/2010 | Sato ...................... G06F 3/1264 358/1.15 |

(Continued)

FOREIGN PATENT DOCUMENTS

| JP | 2004287860 | 10/2004 |
| JP | 2009105680 | 5/2009 |

(Continued)

OTHER PUBLICATIONS

Office Action of Japan Counterpart Application, with English translation thereof, dated Apr. 20, 2021, pp. 1-6.

*Primary Examiner* — Neil R McLean
(74) *Attorney, Agent, or Firm* — JCIPRNET

(57) ABSTRACT

An information processing apparatus includes an editing unit that edits properties included in a printing job ticket so as to include at least a property used by an equipment and to save a property not used by the equipment, before the printing job ticket is transmitted to the equipment, in a process included in a printing workflow using the printing job ticket, and a transmission unit that transmits a printing job ticket from which the saved property is excluded, to the equipment, in which the editing unit performs editing for including the saved property in the printing job ticket, on the equipment that uses the saved property.

10 Claims, 10 Drawing Sheets

(56) References Cited

U.S. PATENT DOCUMENTS

| | | | | |
|---|---|---|---|---|
| 2010/0259785 A1* | 10/2010 | Mori | ............... | G06F 3/1205 |
| | | | | 358/1.15 |
| 2010/0262965 A1* | 10/2010 | Miyata | ............ | G06F 3/1204 |
| | | | | 718/100 |
| 2013/0120799 A1* | 5/2013 | Maeda | ............ | G06F 3/1255 |
| | | | | 358/1.15 |

FOREIGN PATENT DOCUMENTS

| JP | 2010026578 | 2/2010 |
|---|---|---|
| JP | 2010250373 | 11/2010 |
| JP | 2014215800 | 11/2014 |

\* cited by examiner

INFORMATION PROCESSING APPARATUS, NON-TRANSITORY COMPUTER READABLE MEDIUM STORING INFORMATION PROCESSING PROGRAM, AND INFORMATION PROCESSING METHOD

CROSS-REFERENCE TO RELATED APPLICATIONS

This application is based on and claims priority under 35 USC 119 from Japanese Patent Application No. 2017-224545 filed Nov. 22, 2017.

BACKGROUND

Technical Field

The present invention relates to an information processing apparatus, a non-transitory computer readable medium storing an information processing program, and an information processing method.

SUMMARY

According to an aspect of the invention, there is provided an information processing apparatus including an editing unit that edits properties included in a printing job ticket so as to include at least a property used by an equipment and to save a property not used by the equipment, before the printing job ticket is transmitted to the equipment, in a process included in a printing workflow using the printing job ticket, and a transmission unit that transmits a printing job ticket from which the saved property is excluded, to the equipment, in which the editing unit performs editing for including the saved property in the printing job ticket, on the equipment that uses the saved property.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment in realizing the invention will be described with reference to the accompanying drawings.

Figure 1:
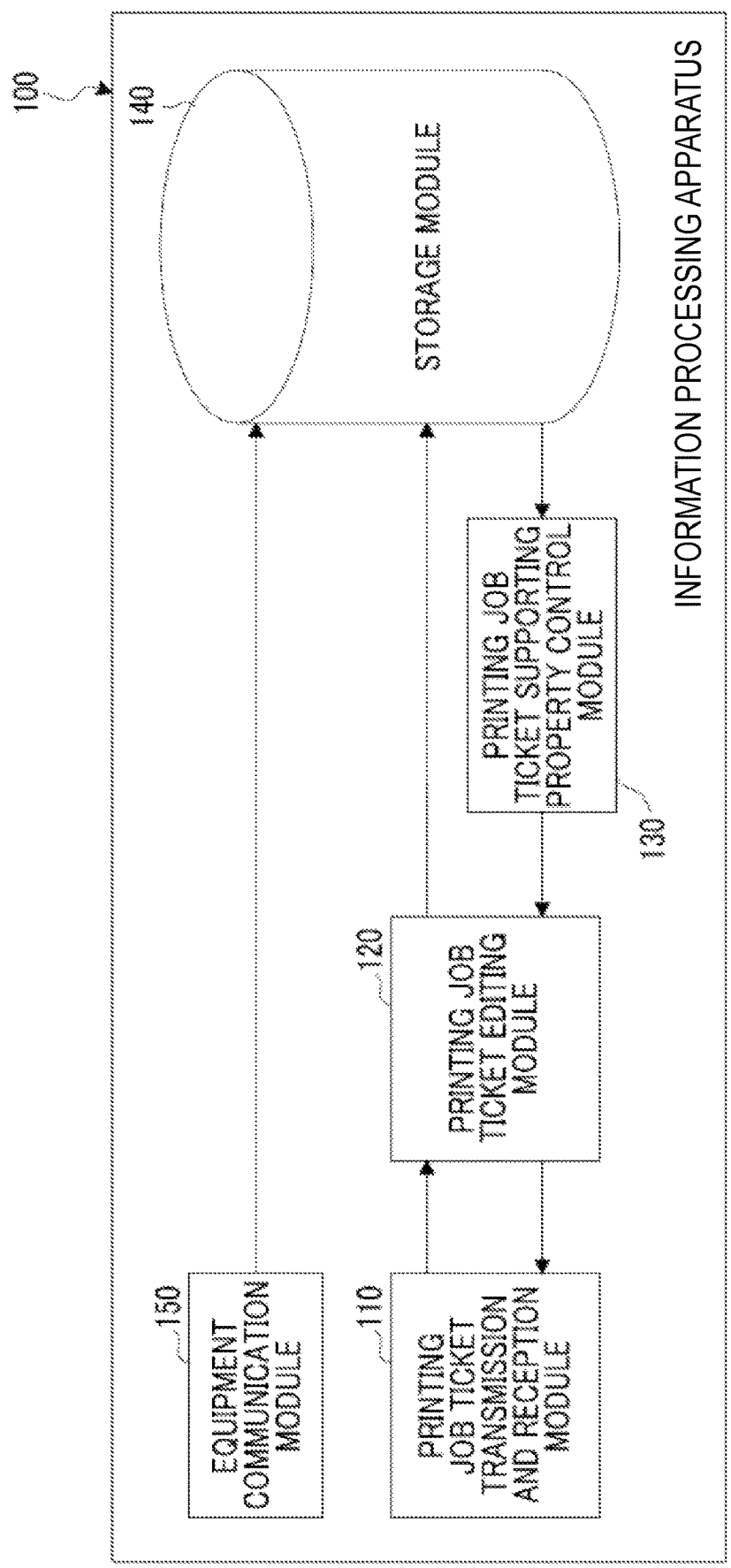
FIG. 1 is a conceptual module configuration diagram illustrating a configuration example according to this exemplary embodiment.

FIG. 1 is a conceptual module configuration diagram illustrating a configuration example of this exemplary embodiment.

Meanwhile, the term "module" refers to components such as software (computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not A holds true, and B is conducted in the case where it is determined that A holds true. However, this excludes cases where the determination of whether or not A holds true may be omitted. Additionally, the case of the listing of things such as "A, B, C" is illustrative listing unless otherwise indicated, and includes a case where only one of them is selected (for example, only A).

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment transmits and receives a printing job ticket to and from an equipment that performs processing in each process of a printing workflow in which the printing job ticket is used. The information processing apparatus includes a printing job ticket transmission and reception module 110, a printing job ticket editing module 120, a printing job ticket supporting property control module 130, a storage module 140, and an equipment communication module 150 as illustrated in the example of FIG. 1.

An example of the printing job ticket is a Job Definition Format (JDF). Hereinafter, a description will be given using a JDF as an example of the printing job ticket. Here, the JDF refers to a data format standardized by CIP4 (The International Cooperation for the Integration of Processes in Prepress Press and Postpress), and is the industry standard designed to simplify the exchange of information between an application around the Graphic Arts industry and a system. Here, CIP4 achieves integration of all processes (for example, processes of prepress, press, and postpress) of printing from the previous process "process" of printing. It is possible to achieve the automation of a printing operation and quality stabilization. For this, the integration is performed by a common file format (JDF). The format of the JDF is based on eXtensible Markup Language (XML), and it is possible to give an instruction for any process related to the creation of printed matter and to perform unified management of work from design work to delivery. Meanwhile, the "prepress" refers to a process before printing, and specifically includes trial printing and the like. The "press" refers to a process of printing, and specifically includes printing processing itself. The "postpress" refers to a process after printing, and specifically includes cutting, folding processing, and the like.

That is, in the printing workflow using a JDF, an equipment reads out the JDF in each process, and advances processing in accordance with contents of the JDF. In the JDF, instructions for various processes are described. Meanwhile, the equipment refers to an equipment that performs processing of processes of the above-described process, prepress, press, and postpress, and includes, for example, a printing apparatus that performs trial printing, a printing apparatus, a postprocess apparatus that performs postprocess such as punching, and the like.

The printing job ticket transmission and reception module 110 is connected to the printing job ticket editing module 120. The printing job ticket transmission and the reception module 110 performs communication (receives transmission) for transmitting and receiving a printing job ticket. That is, processes of the printing workflow are advanced.

The printing job ticket transmission and reception module 110 transmits the printing job ticket from which saved (retreated) properties are excluded by the printing job ticket editing module 120, to the equipment.

The printing job ticket editing module 120 is connected to the printing job ticket transmission and reception module 110, the printing job ticket supporting property control module 130, and the storage module 140. In a case where the printing job ticket editing module 120 receives a printing job ticket, the printing job ticket editing module 120 parses the printing job ticket and stores the printing job ticket in the storage module 140. In a case where the printing job ticket editing module 120 transmits the printing job ticket, properties stored in the storage module 140 are described in the printing job ticket.

The printing job ticket editing module 120 includes at least properties used by the equipment before transmitting the printing job ticket to the equipment, in a process included in a printing workflow using the printing job ticket, and edits the properties within the printing job ticket so as to save properties that are not used by the equipment.

The printing job ticket editing module 120 performs editing for including the saved properties in the printing job ticket, on the equipment using the saved properties.

In addition, the printing job ticket editing module 120 may perform editing in accordance with properties used by an equipment which is detected by the equipment communication module 150.

The printing job ticket supporting property control module 130 is connected to the printing job ticket editing module 120 and the storage module 140. The printing job ticket supporting property control module 130 acquires the properties described in the printing job ticket from the storage module 140 in accordance with an equipment which is a transmission destination, and transmits the acquired properties to the printing job ticket editing module 120.

The storage module 140 is connected to the printing job ticket editing module 120, the printing job ticket supporting property control module 130, and the equipment communication module 150. The storage module 140 stores a table for managing support properties for each equipment to communicate therewith and a table for managing actual processing results. The storage module also stores information (device information) on an equipment performing processing in the printing workflow, and the order of processing.

The equipment communication module 150 is connected to the storage module 140. The equipment communication module 150 communicates with an equipment and detects properties used by the equipment. Specifically, the equipment communication module 150 acquires device information on the equipment used in the printing workflow and properties of a printing job ticket supported by the equipment by communication with the equipment, and stores the acquired device information and properties in the storage module 140.

Figure 2A:
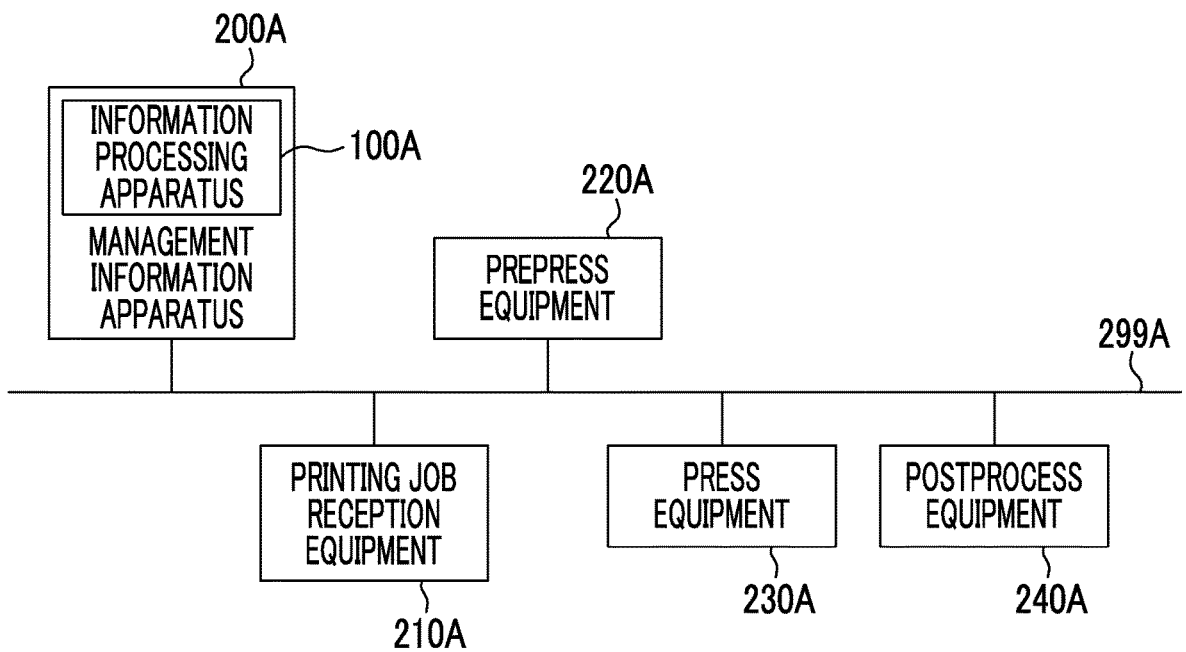
FIGS. 2A and 2B are diagrams illustrating a system configuration example using this exemplary embodiment.
Figure 2B:
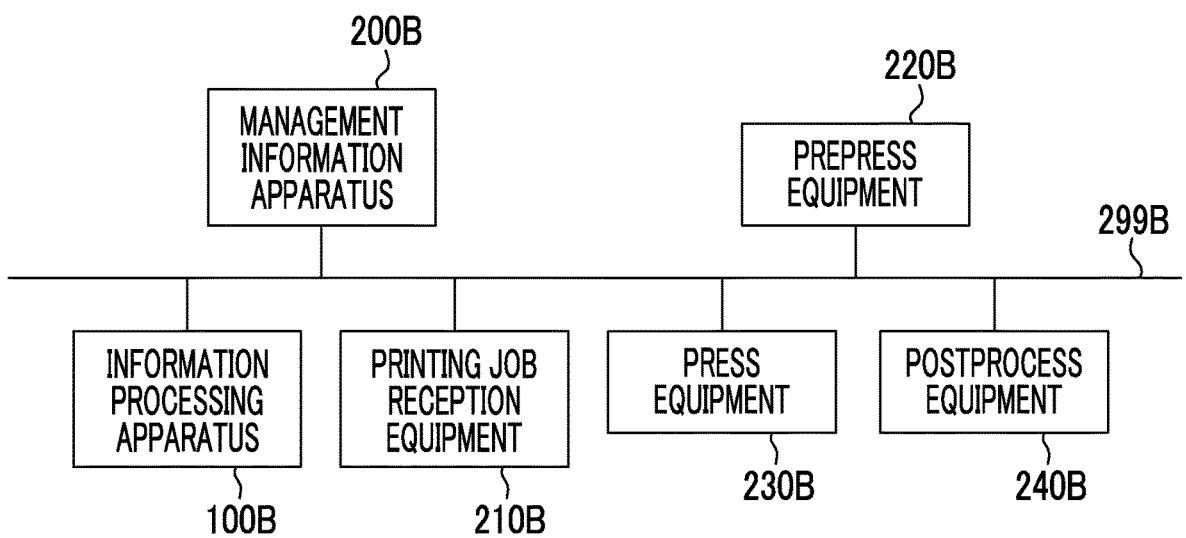

FIGS. 2A and 2B are diagrams illustrating a system configuration example using this exemplary embodiment.

The example of FIG. 2A shows a system configuration in which a management information apparatus 200A includes an information processing apparatus 100A. The management information apparatus 200A, a printing job reception equipment 210A, a prepress equipment 220A, a press equipment 230A, and a postprocess equipment 240A are connected to each other through a communication line 299A. The communication line 299A may be a wireless line, a wired line, or a combination thereof, or may be, for example, an intranet as communication infrastructure. The management information apparatus 200A controls a printing workflow. For example, the management information apparatus 200 has a function as a management information system (MIS). The management information apparatus 200A transmits and receives a printing job ticket to and from the printing job reception equipment 210A, the prepress equipment 220A, the press equipment 230A, and the postprocess equipment 240A to perform the processing of the printing workflow. The management information apparatus 200A includes the information processing apparatus 100A, and thus includes the printing job ticket transmission and reception module 110, the printing job ticket editing module 120, and the like. Processing performed by the printing job ticket transmission and reception module 110, the printing job ticket editing module 120, and the like is performed as processing based on the control of the printing workflow. The "processing based on the control of the printing workflow" specifically refers to taking-in as a part of processing performed by the management information system (taking-in as a function of the management information system). In addition, a function performed by the management information apparatus 200A (naturally, a function performed by the information processing apparatus 100A) may be realized as a cloud service.

The example of FIG. 2B shows a system configuration in which an information processing apparatus 100B and a management information apparatus 200B are provided as separate apparatuses. That is, the example shows that the processing of the information processing apparatus 100B is not performed as a part of MIS.

The information processing apparatus 100B, the management information apparatus 200B, a printing job reception equipment 210B, a prepress equipment 220B, a press equipment 230B, and a postprocess equipment 240B are connected to each other through a communication line 299B.

The information processing apparatus 100B is not included in the management information apparatus 200B. That is, the printing job ticket transmission and reception module 110 and the printing job ticket editing module 120 are included in the information processing apparatus 100B which is a processing apparatus separate from the management information apparatus 200B that controls a printing workflow. As processing different from the control of the printing workflow by the management information apparatus 200B, the processing of the information processing apparatus 100B (particularly, the printing job ticket transmission and reception module 110 and the printing job ticket editing module 120) is performed. The wording "as processing different from the control of the printing workflow" refers to processing performed separately from processing by the management information system. However, processing (for example, processing of the printing job ticket transmission and reception module 110 and the like is performed in a case where any processing of the processing by the management information system is terminated. On contrary, any processing of the processing by the management information system is performed in a case where processing of the printing job ticket transmission and reception module 110 and the like is performed) which is associated with the processing by the management information system may be performed. In addition, functions performed by the management information apparatus 200B and the information processing apparatus 100B may be realized as a cloud service.

Figure 3A:
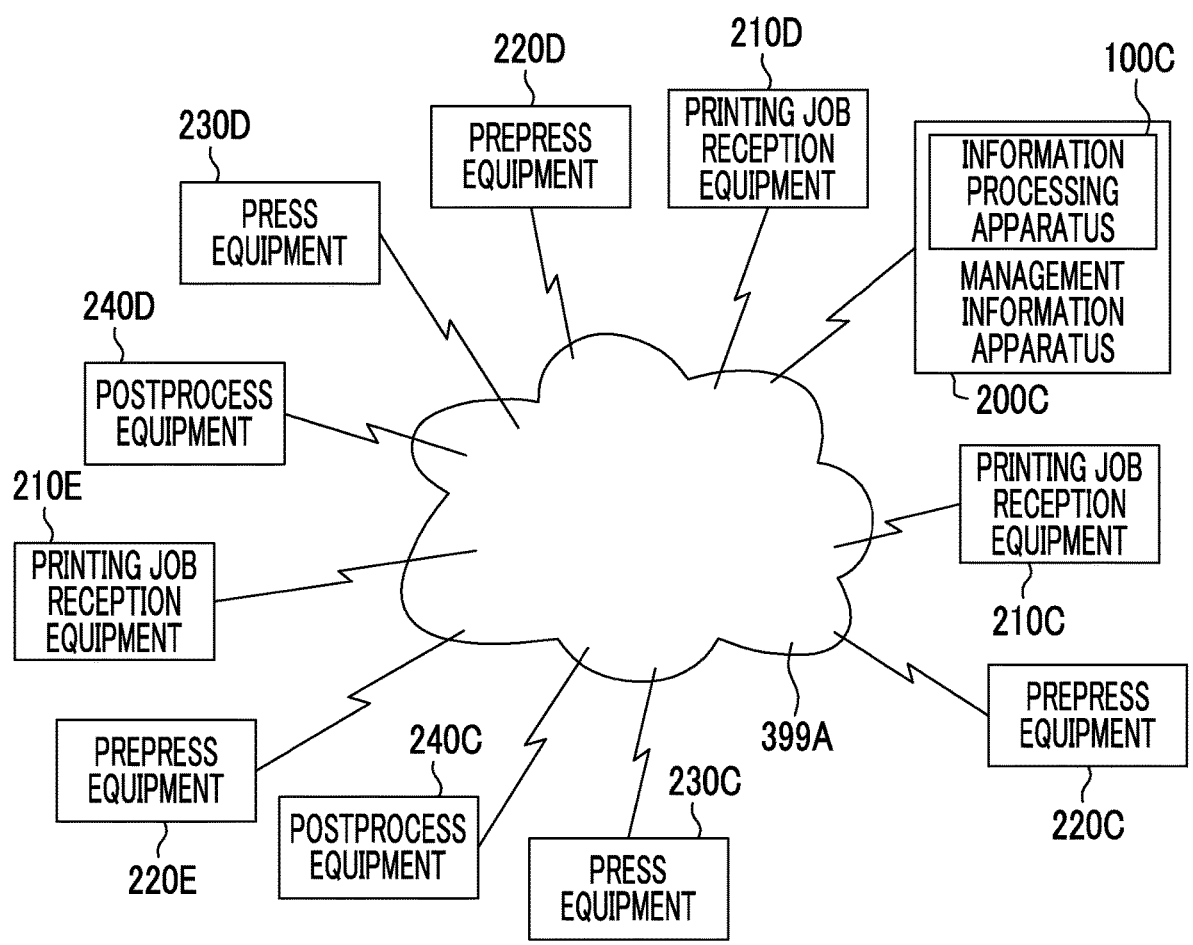
FIGS. 3A and 3B are diagrams illustrating a system configuration example using this exemplary embodiment.
Figure 3B:
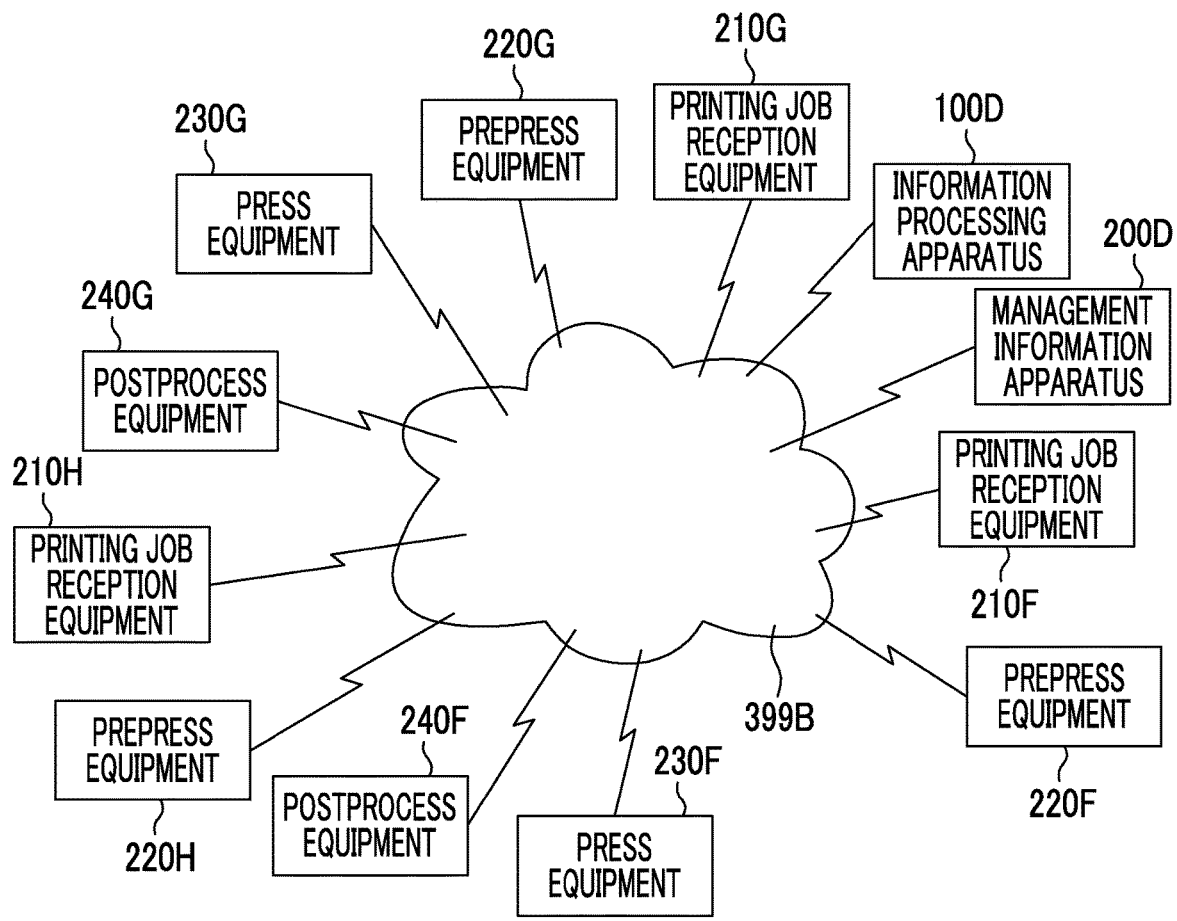

FIGS. 3A and 3B are diagrams illustrating a system configuration example using this exemplary embodiment. A system configuration illustrated in the example of FIG. 2 is realized on an Internet line.

The example of FIG. 3A shows a system configuration corresponding to FIG. 2A, and shows a system configuration in which a management information apparatus 200C includes an information processing apparatus 100C. The management information apparatus 200C includes the information processing apparatus 100C. The management information apparatus 200C, a printing job reception equipment 210C, a printing job reception equipment 210D, a printing job reception equipment 210E, a prepress equipment 220C, a prepress equipment 220D, a prepress equipment 220E, a press equipment 230C, a press equipment 230D, a press equipment 230E, a postprocess equipment 240C, a postprocess equipment 240D, and a postprocess equipment 240E are connected to each other through a communication line 399A. The communication line 399A may be a wireless line, a wired line, or a combination thereof, or may be, for example, the Internet as communication infrastructure. In addition, a function performed by the management information apparatus 200C (naturally, a function performed by the information processing apparatus 100C) may be realized as a cloud service.

The example of FIG. 3B shows a system configuration corresponding to FIG. 2B, and shows a system configuration in which an information processing apparatus 100D and a management information apparatus 200D are provided as separate apparatuses. That is, the example shows that the processing of the information processing apparatus 100D is not performed as a part of MIS. The information processing apparatus 100D, the management information apparatus 200D, a printing job reception equipment 210F, a printing job reception equipment 210G, a printing job reception equipment 210H, a prepress equipment 220F, a prepress equipment 220G, a prepress equipment 220H, a press equipment 230F, a press equipment 230G, a postprocess equipment 240F, and a postprocess equipment 240G are connected to each other through a communication line 399B.

The information processing apparatus 100D is not included in the management information apparatus 200D. That is, the printing job ticket transmission and reception module 110 and the printing job ticket editing module 120 are included in the information processing apparatus 100D which is a processing apparatus separate from the management information apparatus 200D that controls a printing workflow. As processing different from the control of the printing workflow by the management information apparatus 200D, the processing of the information processing apparatus 100D (particularly, the printing job ticket transmission and reception module 110 and the printing job ticket editing module 120) is performed. The wording "as processing different from the control of the printing workflow" refers to processing performed separately from processing by the management information system. However, as described above, processing (for example, processing of the printing job ticket transmission and reception module 110 and the like is performed in a case where any processing of the processing by the management information system is terminated. On contrary, any processing of the processing by the management information system is performed in a case where processing of the printing job ticket transmission and reception module 110 and the like is performed) which is associated with the processing by the management information system may be performed. In addition, functions performed by the management information apparatus 200D and the information processing apparatus 100D may be realized as a cloud service.

Figure 4:
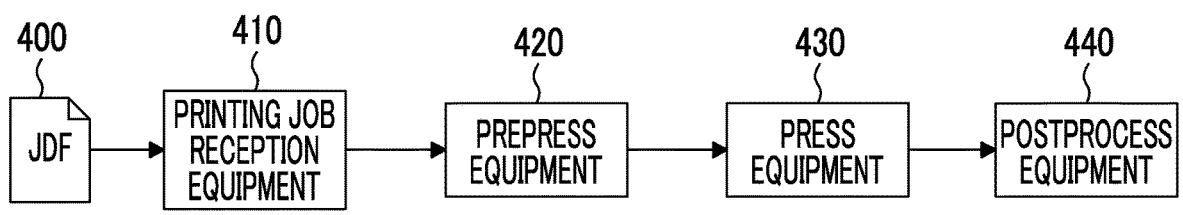
FIG. 4 is a diagram illustrating an association example using an equipment in a printing workflow.

FIG. 4 is a diagram illustrating an association example using an equipment in a printing workflow.

A JDF 400 is successively transmitted to a printing job reception equipment 410, a prepress equipment 420, a press equipment 430, and a postprocess equipment 440 to perform processing of a printing workflow. Specifically, the printing job reception equipment 410 receives the JDF 400 and transmits the received JDF to the prepress equipment 420. The prepress equipment 420 performs prepress processing (trial printing processing) in accordance with an instruction in the JDF 400, and then transmits the JDF 400 to the press equipment 430. The press equipment 430 performs press processing (printing processing) in accordance with an instruction in the JDF 400, and then transmits the JDF 400 to the postprocess equipment 440. The postprocess equipment 440 performs postprocess (processing such as punching and binding) in accordance with an instruction in the JDF 400. Thereafter, processing such as inspection on printed matter and delivery is performed.

In performing the processing based on the printing workflow, properties that do not correspond to an equipment itself may be deleted during the output of the properties (when the properties are transmitted to the next equipment) or may be set to be errors, depending on the equipment (the printing job reception equipment 410, the prepress equipment 420, the press equipment 430, and the postprocess equipment 440). The properties in the JDF 400 correspond to the entire printing workflow. Accordingly, in a case where properties used by the other equipments are deleted by individual equipments or are set to be errors, an equipment (equipment positioned on the downstream side of the printing workflow) which originally uses the properties may not correspond to the properties.

Consequently, the information processing apparatus 100 saves and adds the properties of the JDF 400, depending on an equipment that performs the processing of the printing workflow. Specifically, when a property is transmitted to any equipment, it is controlled which property in the JDF 400 is saved or added.

Figure 5:
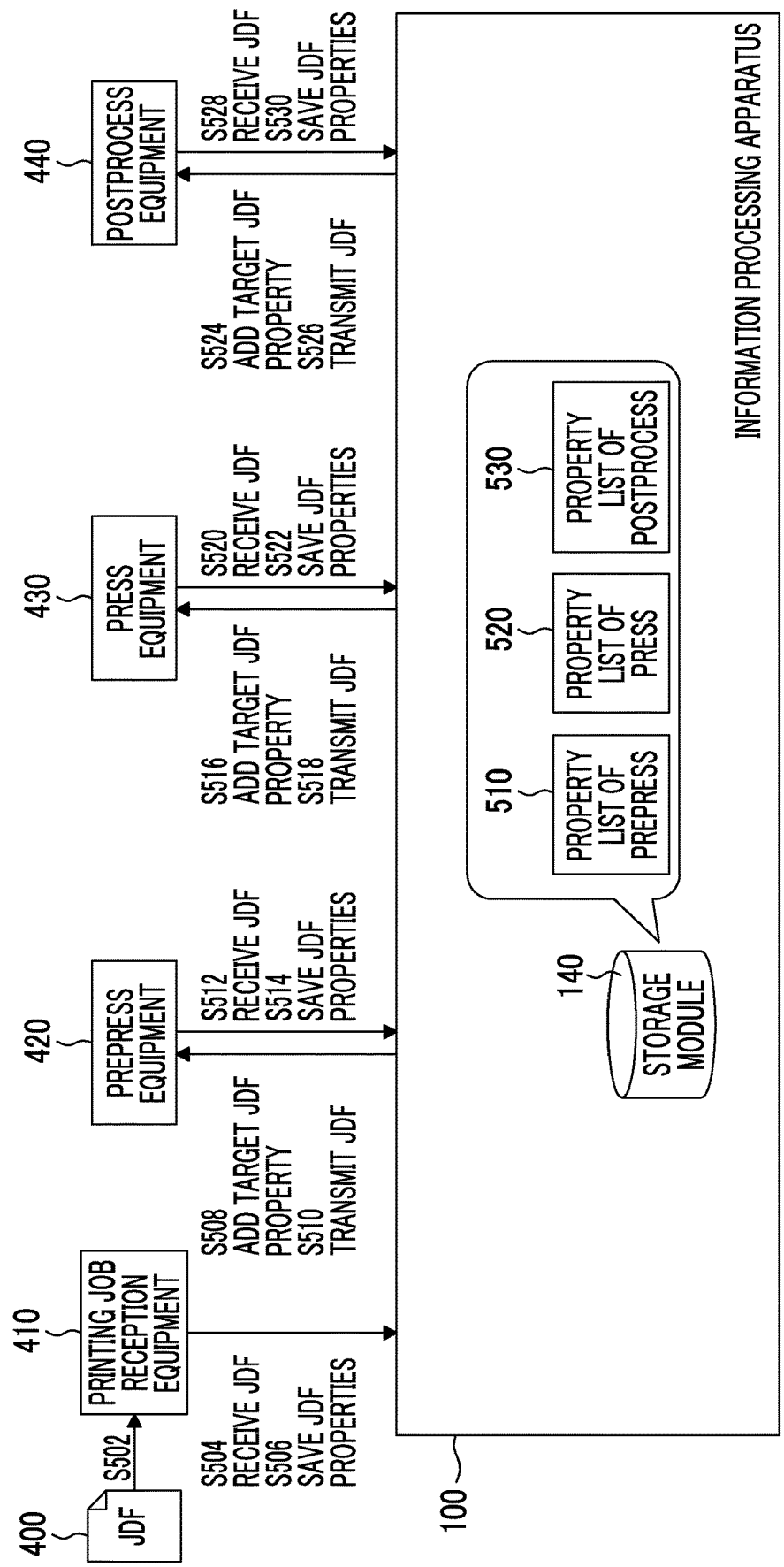
FIG. 5 is a diagram illustrating a processing example according to this exemplary embodiment.

FIG. 5 is a diagram illustrating a processing example according to this exemplary embodiment.

The JDF 400 includes a property list of prepress 510, a property list of press 520, and a property list of postprocess 530 as properties.

In step S502, the printing job reception equipment 410 receives the JDF 400.

In step S504, the information processing apparatus 100 receives the JDF 400 by the printing job reception equipment 410.

In step S506, the information processing apparatus 100 saves JDF properties. That is, the property list of prepress 510, the property list of press 520, and the property list of postprocess 530 are stored in the storage module 140.

In step S508, the information processing apparatus 100 adds a target JDF property (JDF property required for the prepress equipment 420) to the JDF 400.

In step S510, the information processing apparatus 100 transmits the JDF 400 to the prepress equipment 420. In the prepress equipment 420, processing is performed in accordance with the JDF 400.

In step S512, the information processing apparatus 100 receives the JDF 400 from the prepress equipment 420.

In step S514, the information processing apparatus 100 saves the JDF properties. That is, the property list of prepress 510, the property list of press 520, and the property list of postprocess 530 at this point in time are stored in the storage module 140.

In step S516, the information processing apparatus 100 adds a target JDF property.

In step S518, the information processing apparatus 100 transmits the JDF 400 to the press equipment 430. In the press equipment 430, processing is performed in accordance with the JDF 400.

In step S520, the information processing apparatus 100 receives the JDF 400 from the press equipment 430.

In step S522, the information processing apparatus 100 saves the JDF properties. That is, the property list of prepress 510, the property list of press 520, and the property list of postprocess 530 at this point in time are stored in the storage module 140.

In step S524, the information processing apparatus 100 adds a target JDF property.

In step S526, the information processing apparatus 100 transmits the JDF 400 to the postprocess equipment 440. In the postprocess equipment 440, processing is performed in accordance with the JDF 400.

In step S528, the information processing apparatus 100 receives the JDF 400 from the postprocess equipment 440.

In step S530, the information processing apparatus 100 saves the JDF properties. That is, the property list of prepress 510, the property list of press 520, and the property list of postprocess 530 at this point in time are stored in the storage module 140.

Figure 6:
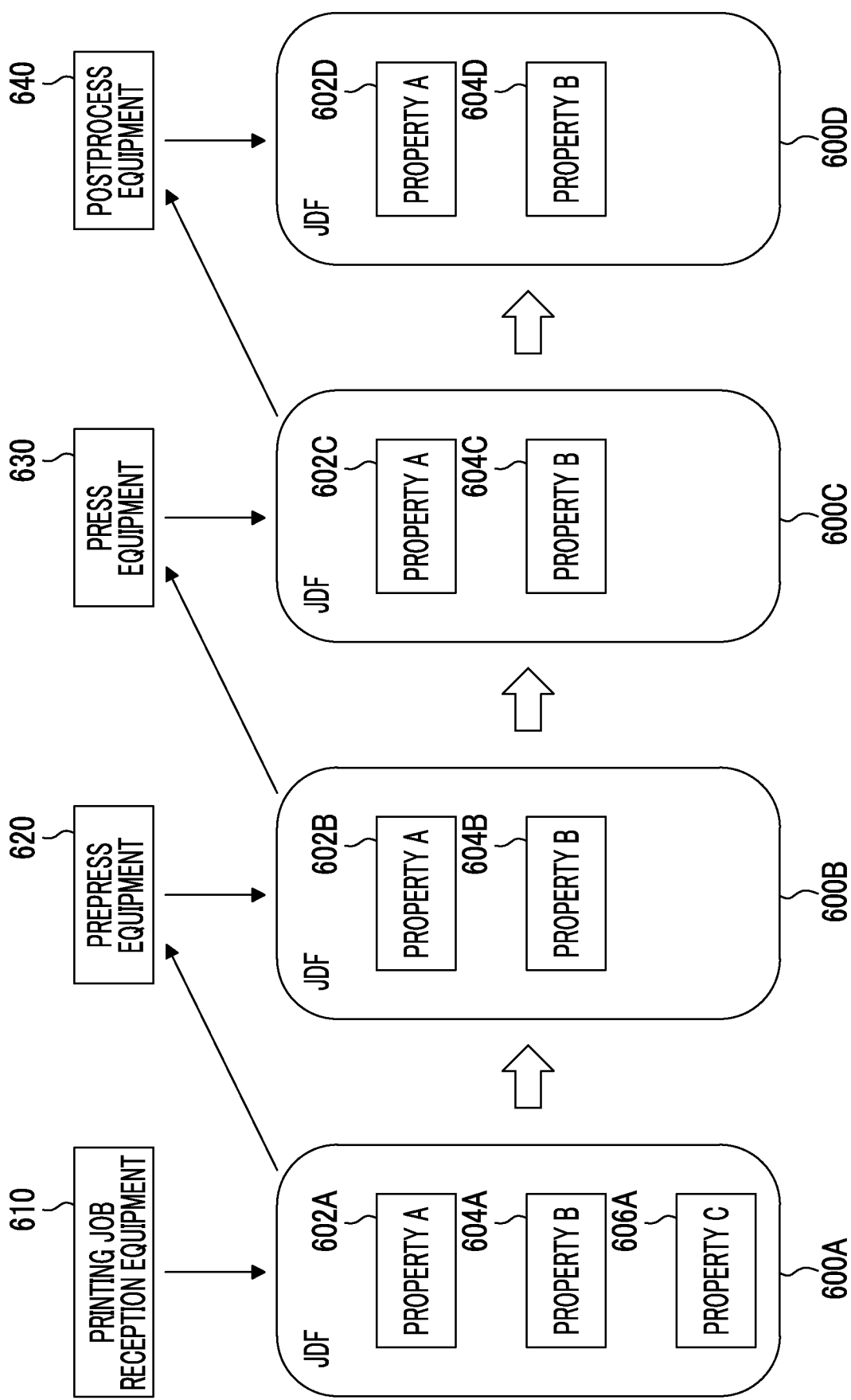
FIG. 6 is a diagram illustrating an association example using an equipment in a printing workflow.

FIG. 6 is a diagram illustrating an association example using an equipment in a printing workflow. That is, the diagram shows a processing example in a case where the information processing apparatus 100 is not used.

A printing job reception equipment 610 outputs a JDF 600A to a prepress equipment 620. The JDF 600A includes a property A: 602A, a property B: 604A, and a property C: 606A.

Although the prepress equipment 620 performs processing in accordance with the JDF 600A, the prepress equipment deletes the property C: 606A due to its unnecessity to generate a JDF 600B, and outputs the generated JDF to the press equipment 630. That is, the JDF 600B includes a property A: 602B and a property B: 604B, but does not include the property C: 606A. Thereafter, processing based on the JDF 600B is also performed, and thus the property C: 606A remains deleted. Meanwhile, the property A: 602B and the property B: 604B may also be the property A: 602A and the property B: 604A, respectively, but may also be changed by the prepress equipment 620.

The press equipment 630 performs processing in accordance with the JDF 600B. The press equipment generates the JDF 600C and outputs the generated JDF to the postprocess equipment 640. That is, the JDF 600C includes a property A: 602C and a property B: 604C, but does not naturally include the property C: 606A. Meanwhile, the property A: 602C and the property B: 604C may also be the property A: 602B and the property B: 604B, respectively, but may also be changed by the press equipment 630.

The postprocess equipment 640 performs processing in accordance with the JDF 600C. However, the property C: 606A which is required for the processing of the postprocess equipment 640 is not included in the JDF 600C (the property C: 606A is not reflected on the JDF 600C), and thus the postprocess equipment 640 may not perform the original processing.

Figure 7:
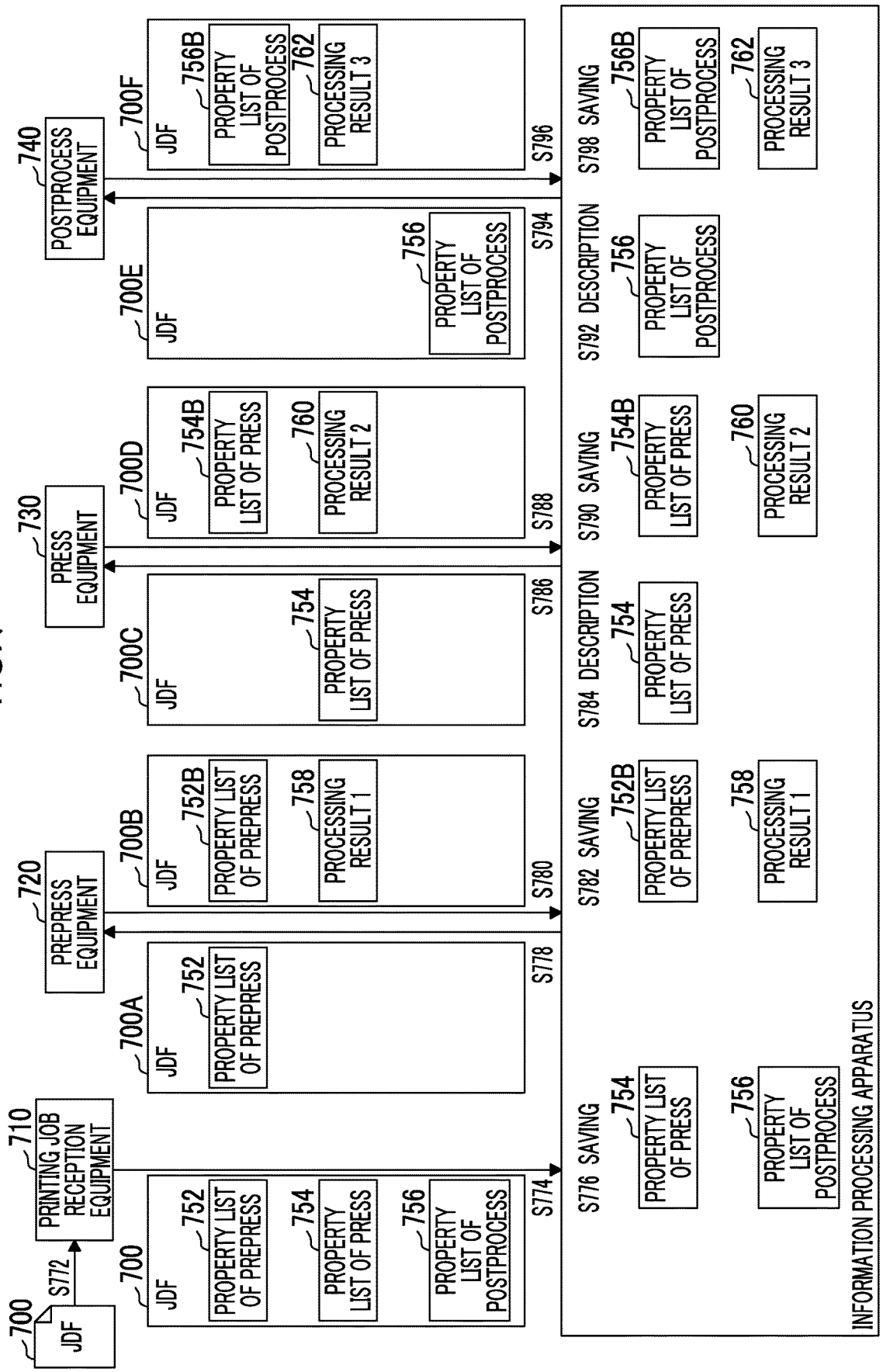
FIG. 7 is a diagram illustrating a processing example according to this exemplary embodiment.

FIG. 7 is a diagram illustrating a processing example according to this exemplary embodiment. A JDF 700 includes a property list of prepress 752, a property list of press 754, and a property list of postprocess 756 as properties.

In step S772, a printing job reception equipment 710 receives the JDF 700.

In step S774, the printing job reception equipment 710 transmits the JDF 700 to the information processing apparatus 100. The JDF 700 at this point in time includes the property list of prepress 752, the property list of press 754, and the property list of postprocess 756.

In step S776, the information processing apparatus 100 saves the property list of press 754 and the property list of postprocess 756 from the JDF 700. The property list of press 754 and the property list of postprocess 756 are properties that are not used in a prepress equipment 720.

In step S778, the information processing apparatus 100 transmits a JDF 700A to the prepress equipment 720. The JDF 700A includes the property list of prepress 752. The property list of prepress 752 being used in the prepress equipment 720 is detected from the prepress equipment 720 in advance. Meanwhile, the property list of press 754 and the property list of postprocess 756 may be included in the JDF 700A. The property list of press 754 and the property list of postprocess 756 are saved (stored in the storage module 140) in step S776 even in a case where the lists are deleted in the prepress equipment 720, and thus the lists may be used in the subsequent JDF 700C and the like.

In step S780, the prepress equipment 720 transmits a JDF 700B to the information processing apparatus 100. The JDF 700B includes a property list of prepress 752B and a processing result 1: 758. Meanwhile, the property list of prepress 752B may be the property list of prepress 752 itself, and may be changed by the prepress equipment 720. For example, color information in the property list of prepress 752 may be changed. Specifically, an instruction such as "darken red" is given from the processing results of the prepress equipment 720, and there is the property list of prepress 752B having color information changed in accordance with the instruction, and the like. In addition, the processing result 1: 758 which is a processing result of the prepress equipment 720 is received.

In step S782, the information processing apparatus 100 saves the property list of prepress 752B and the processing result 1: 758.

In step S784, the information processing apparatus 100 describes the property list of press 754 in the JDF 700C. The property list of press 754 being used in the press equipment 730 is detected from the press equipment 730 in advance. Meanwhile, the property list of press 754 may be changed by the JDF 700B (that is, the property list of prepress 752B and the processing result 1: 758). For example, as described above, results of the change of the color information in the prepress equipment 720 may be reflected into the property list of press 754.

In step S786, the information processing apparatus 100 transmits the JDF 700C to the press equipment 730. The JDF 700C includes the property list of press 754.

In step S788, the press equipment 730 transmits a JDF 700D to the information processing apparatus 100. The JDF 700D includes a property list of press 754B and a processing result 2: 760. Meanwhile, the property list of press 754B may be the property list of press 754 itself, and may be changed by the press equipment 730. In addition, the processing result 2: 760 which is a processing result of the press equipment 730 is received.

In step S790, the information processing apparatus 100 saves the property list of press 754B and the processing result 2: 760.

In step S792, the information processing apparatus 100 describes the property list of postprocess 756.

In step S794, the information processing apparatus 100 transmits a JDF 700E to the postprocess equipment 740. The JDF 700E includes the property list of postprocess 756.

In step S796, the postprocess equipment 740 transmits a JDF 700F to the information processing apparatus 100. The JDF 700F includes a property list of postprocess 756B and a processing result 3: 762. Meanwhile, the property list of postprocess 756B may be the property list of postprocess 756 itself, and may be changed by the postprocess equipment 740. In addition, the processing result 3: 762 which is a processing result of the postprocess equipment 740 is received.

In step S798, the information processing apparatus 100 saves the property list of postprocess 756B and the processing result 3: 762.

Figure 8:
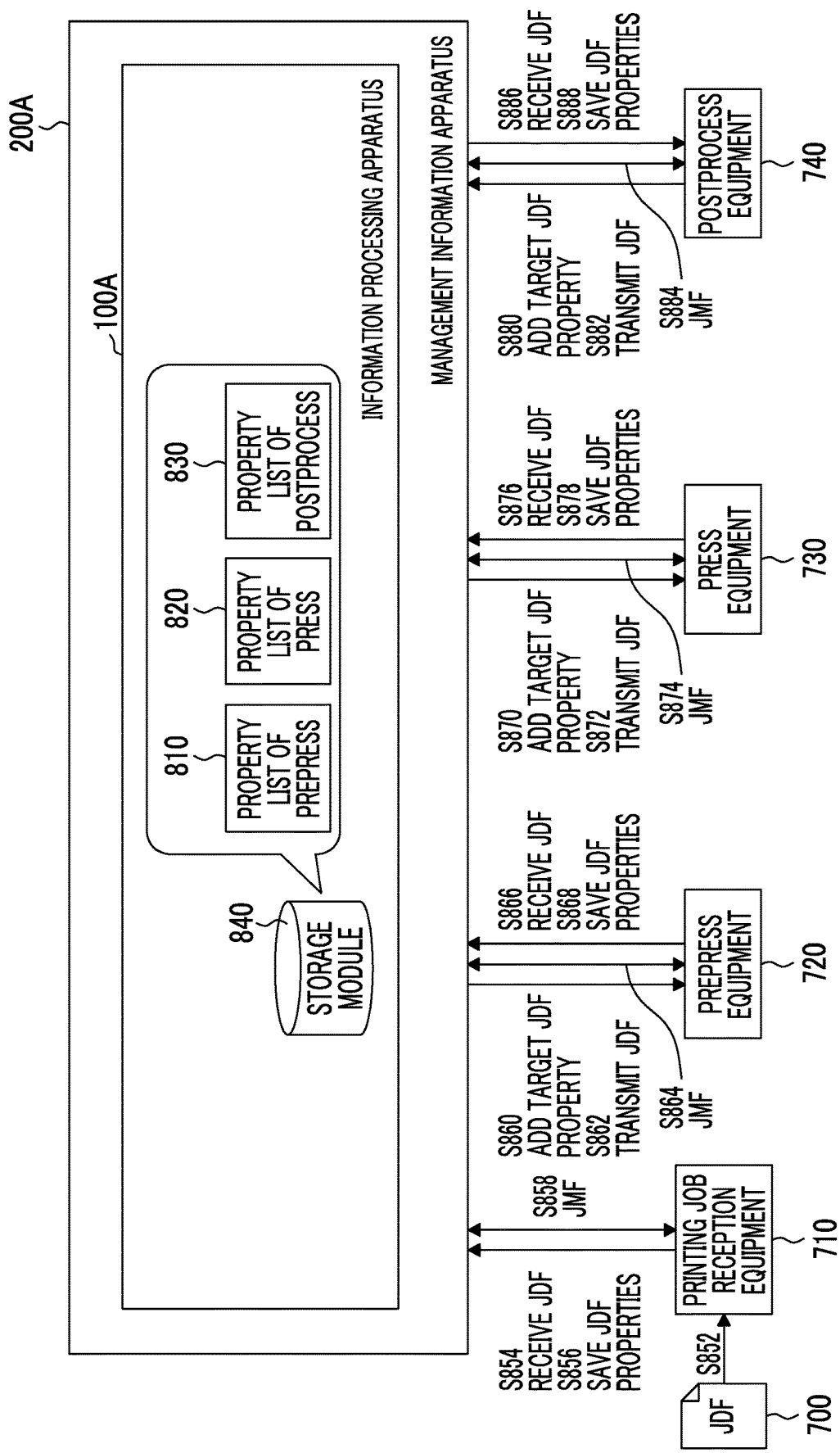
FIG. 8 is a diagram illustrating a processing example according to this exemplary embodiment.

FIG. 8 is a diagram illustrating a processing example according to this exemplary embodiment. The functions of the information processing apparatus 100 are realized as function extension of the management information apparatus 200A (MIS).

Step S858, step S864, step S874, and step S884 which are processing related to a Job Messaging Format (JMF) are added to processing illustrated in the example of FIG. 7. The JMF includes information on events (start, stop, an error, and the like), conditions (being usable, offline, and the like), and results (quantity, consumption, and the like). That is, conditions of a JDF job and production data (delivery or a printing time, a sheet used for the printing of a job, and the like) may be transmitted to the management information apparatus 200A as feedbacks.

The JDF 700 includes a property list of prepress 810, a property list of press 820, and a property list of postprocess 830. The property list of prepress 810, the property list of press 820, and the property list of postprocess 830 are stored in a storage module 840.

In step S852, the printing job reception equipment 710 receives the JDF 700.

In step S854, the management information apparatus 200A (information processing apparatus 100A) receives the JDF 700 from the printing job reception equipment 710.

In step S856, the management information apparatus 200A (information processing apparatus 100A) saves JDF properties.

In step S858, the management information apparatus 200A (information processing apparatus 100A) and the printing job reception equipment 710 transmit and receive the JMF to and from each other.

In step S860, the management information apparatus 200A (information processing apparatus 100A) adds a target JDF property.

In step S862, the management information apparatus 200A (information processing apparatus 100A) transmits the JDF 700 to the prepress equipment 720.

In step S864, the management information apparatus 200A (information processing apparatus 100A) and the prepress equipment 720 transmit and receive the JMF to and from each other.

In step S866, the management information apparatus 200A (information processing apparatus 100A) receives the JDF 700 from the prepress equipment 720.

In step S868, the management information apparatus 200A (information processing apparatus 100A) saves the JDF properties.

In step S870, the management information apparatus 200A (information processing apparatus 100A) adds a target JDF property.

In step S872, the management information apparatus 200A (information processing apparatus 100A) transmits the JDF 700 to the press equipment 730.

In step S874, the management information apparatus 200A (information processing apparatus 100A) and the press equipment 730 transmit and receive the JMF to and from each other.

In step S876, the management information apparatus 200A (information processing apparatus 100A) receives the JDF 700 from the press equipment 730.

In step S878, the management information apparatus 200A (information processing apparatus 100A) saves the JDF properties.

In step S880, the management information apparatus 200A (information processing apparatus 100A) adds a target JDF property.

In step S882, the management information apparatus 200A (information processing apparatus 100A) transmits the JDF 700 to the postprocess equipment 740.

In step S884, the management information apparatus 200A (information processing apparatus 100A) and the postprocess equipment 740 transmit and receive the JMF to and from each other.

In step S886, the management information apparatus 200A (information processing apparatus 100A) receives the JDF 700 from the postprocess equipment 740.

In step S888, the management information apparatus 200A (information processing apparatus 100A) saves the JDF properties.

Figure 9:
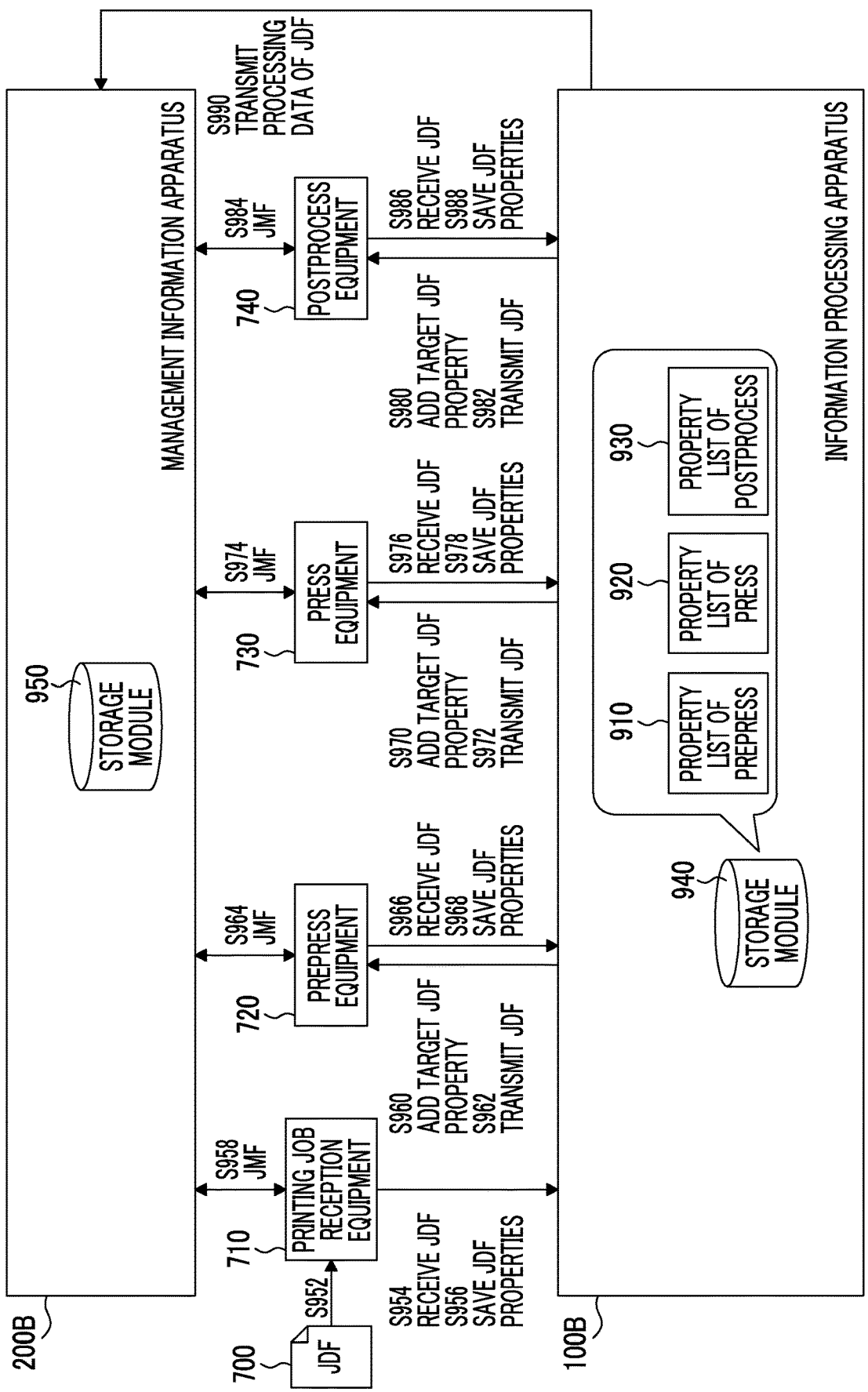
FIG. 9 is a diagram illustrating a processing example according to this exemplary embodiment.

FIG. 9 is a diagram illustrating a processing example according to this exemplary embodiment. The example shows the information processing apparatus 100B which is realized within a server separate from the management information apparatus 200B (MIS). The management information apparatus 200B performs JMF communication with plural equipments, and thus may have a problem of performance. The information processing apparatus 100B is provided as a system separate from the management information apparatus 200B, and thus it is possible to reduce the load of the management information apparatus 200B.

Step S958, step S964, step S974, step S984, and step S990 which are processing related to a JMF are added to the processing illustrated in the example of FIG. 7.

The JDF 700 includes a property list of prepress 910, a property list of press 920, and a property list of postprocess 930. The property list of prepress 910, the property list of press 920, and the property list of postprocess 930 are stored in a storage module 940.

In step S952, the printing job reception equipment 710 receives the JDF 700.

In step S954, the information processing apparatus 100B receives the JDF 700 from the printing job reception equipment 710.

In step S956, the information processing apparatus 100B saves JDF properties.

In step S958, the printing job reception equipment 210B and the printing job reception equipment 710 transmit and receive the JMF to and from each other.

In step S960, the information processing apparatus 100B adds a target JDF property.

In step S962, the information processing apparatus 100B transmits the JDF 700 to the prepress equipment 720.

In step S964, the printing job reception equipment 210B and the prepress equipment 720 transmit and receive the JMF to and from each other.

In step S966, the information processing apparatus 100B receives the JDF 700 from the prepress equipment 720.

In step S968, the information processing apparatus 100B saves the JDF properties.

In step S970, the information processing apparatus 100B adds a target JDF property.

In step S972, the information processing apparatus 100B transmits the JDF 700 to the press equipment 730.

In step S974, the printing job reception equipment 210B and the press equipment 730 transmit and receive the JMF to and from each other.

In step S976, the information processing apparatus 100B receives the JDF 700 from the press equipment 730.

In step S978, the information processing apparatus 100B saves the JDF properties.

In step S980, the information processing apparatus 100B adds a target JDF property.

In step S982, the information processing apparatus 100B transmits the JDF 700 to the postprocess equipment 740.

In step S984, the printing job reception equipment 210B and the postprocess equipment 740 transmit and receive the JMF to and from each other.

In step S986, the information processing apparatus 100B receives the JDF 700 from the postprocess equipment 740.

In step S988, the information processing apparatus 100B saves the JDF properties.

In step S990, the information processing apparatus 100B transmits actual processing results (processing data of the JDF 700, and specifically, the status, actual results, and the like in each process) of the information processing apparatus 100B to the management information apparatus 200B. The management information apparatus 200B stores the actual processing results in a storage module 950.

Figure 10:
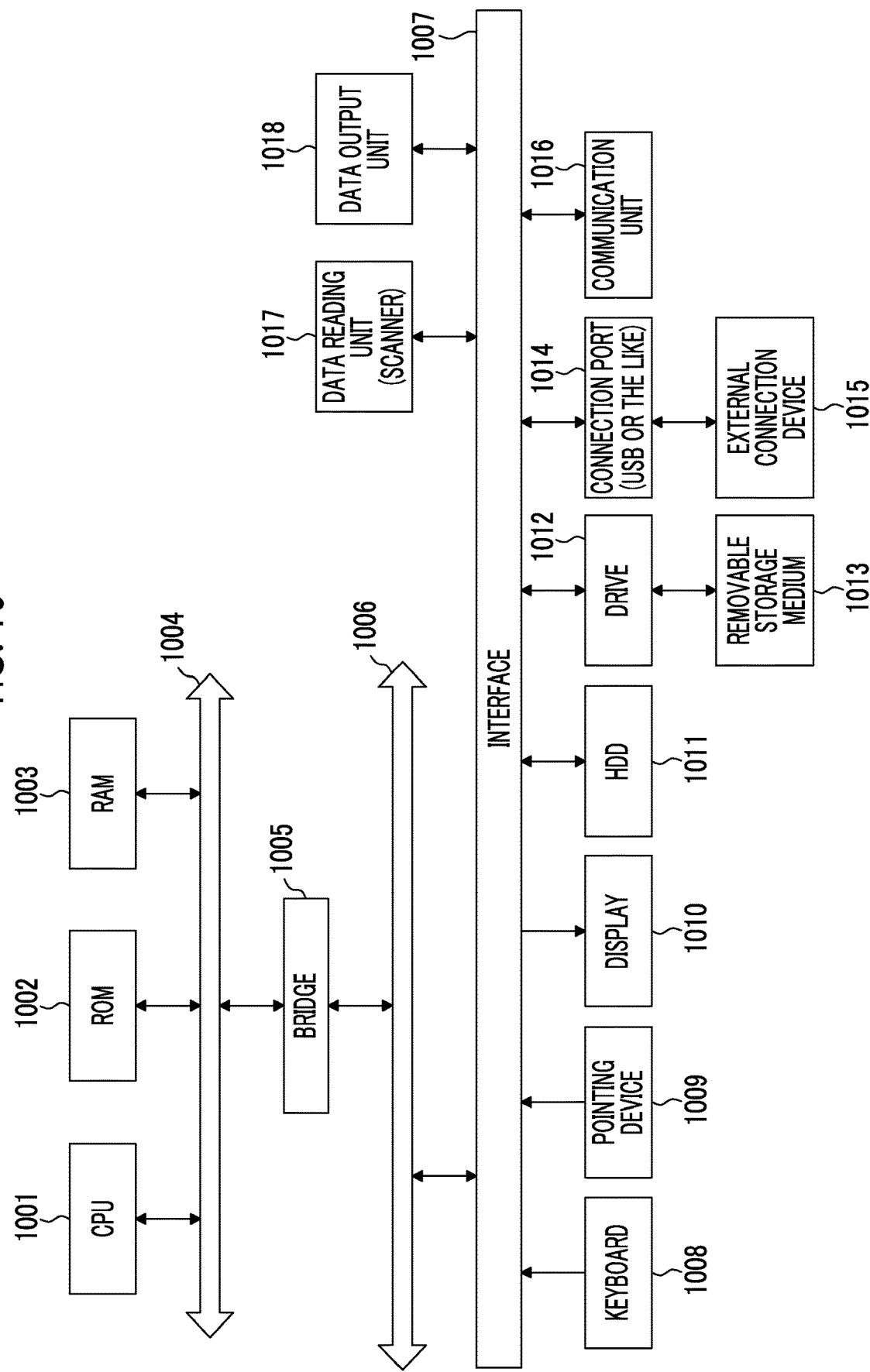
FIG. 10 is a block diagram illustrating a hardware configuration example of a computer for realizing this exemplary embodiment.

A hardware configuration example of the information processing apparatus 100 according to this exemplary embodiment will be described with reference to FIG. 10. The configuration illustrated in FIG. 10 is constituted by, for example, a personal computer (PC) and the like, and the hardware configuration example including a data reading unit 1017 such as a scanner and a data output unit 1018 such as a printer is illustrated.

A Central Processing Unit (CPU) 1001 is a control unit that executes processing based on a computer program in which the execution sequence of various modules described in the above-described exemplary embodiment, that is, the printing job ticket transmission and reception module 110, the printing job ticket editing module 120, the printing job ticket supporting property control module 130, and the equipment communication module 150 is described.

A Read Only Memory (ROM) 1002 stores programs, computational parameters, and the like which are used by the CPU 1001. A Random Access Memory (RAM) 1003 stores programs used in the execution of the CPU 1001, parameters that appropriately change in the execution, and the like. The Rom and the RAM are connected to each other by a host bus 1004 constituted by a CPU bus or the like.

The host bus 1004 is connected to an external bus 1006 such as a Peripheral Component Interconnect/Interface (PCI) bus through a bridge 1005.

A keyboard 1008 and a pointing device 1009 such as a mouse are devices operated by an operator. A display 1010 is a liquid crystal device, a Cathode Ray Tube (CRT), or the like, and displays various pieces of information as texts or image information. In addition, a touch screen or the like which has both functions as the pointing device 1009 and the display 1010 may be used. In this case, regarding the realization of the function of the keyboard, the function of the keyboard may be realized by drawing a keyboard (also referred to as a so-called software keyboard, a screen keyboard, or the like) on a screen (touch screen) using software without physical connection like the keyboard 1008.

A Hard Disk Drive (HDD) 1011 has a hard disk (may be a flash memory or the like) embedded therein, drives the hard disk, and records or reproduces programs executed by the CPU 1001 and information. The hard disk realizes functions as the storage module 140 and the like. Further, the hard disk stores various other data, various computer programs, and the like.

The drive 1012 reads out data or programs recorded in a removable storage medium 1013, such as a magnetic disk, an optical disk, a magneto-optical disk, or a semiconductor memory, which is mounted therein, and supplies the data or the programs to the RAM 1003 connected thereto to the RAM 1003 connected thereto through an interface 1007, the external bus 1006, the bridge 1005, and the host bus 1004. Meanwhile, the removable storage medium 1013 may also be used as data storage region.

The connection port 1014 is a port for connection to an external connection device 1015, and includes a connection unit such as a USB or IEEE1394. The connection port 1014 is connected to the CPU 1001 and the like through the interface 1007, the external bus 1006, the bridge 1005, the host bus 1004, and the like. A communication unit 1016 is connected to a communication line, and executes data communication processing with the outside. The data reading unit 1017 is, for example, a scanner, and executes a process of reading a document. A data output unit 1018 is, for example, a printer, and executes a process of outputting document data.

Meanwhile, a hardware configuration of the information processing apparatus 100 illustrated in FIG. 10 shows one configuration example. This exemplary embodiment is not limited to the configuration illustrated in FIG. 10, and the information processing apparatus may be configured such that the modules described in this exemplary embodiment are capable of being executed. For example, some modules may be constituted by dedicated hardware (for example, an Application Specific Integrated Circuit (ASIC) or the like), some modules may be configured to be provided in an external system and connected to each other through a communication line, or plural systems each of which is illustrated in FIG. 10 may be connected to each other through a communication line and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multi-function machine (an image processing apparatus including any two or more of a scanner, a printer, a copying machine, and a facsimile), and the like, in addition to a personal computer.

Meanwhile, as described in step S780 in the example of FIG. 7, in a case where a change is made to properties in the middle of processing of a printing workflow, the change of the properties may be reflected in the subsequent processing from the changed contents. For example, in a case where an operator converts the setting of monochrome into the setting of color in prepress processing, the conversion from monochrome into color is determined from processing results, and color profile information which is set in advance during transmission to the press equipment 730 may be added to a printing job ticket and transmitted to the press equipment 730.

Additionally, in a case where a change is made to properties in the middle of processing of a printing workflow, changed contents may be returned to a high order system (for example, a printing job ticket generation system) and reflected on the generation of the subsequent printing job ticket. For example, in a case where an operator of the press processing changes a color profile A, which is automatically set, to a color profile B, the information processing apparatus 100 detects the change from processing results, and notifies the printing job ticket generation system of the changed contents. The printing job ticket generation system may automatically set the color profile B for a printing job similar to printing properties of the changed printing job. Meanwhile, being similar includes the same requester, the same type of document (for example, in a case where a color profile of a business card is changed, the changed color profile of the business card will be used thereafter), using the same printing equipment, using the same printing sheet, and the like.

Meanwhile, the programs described above may be provided through a recording medium which stores the programs, or may be provided through a communication unit. In these cases, for example, the programs described above may be interpreted as an invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Further, the above-described programs may be a portion or all of other programs, or may be recorded on a recording medium along with other programs. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    a processor configured to:
    edit properties included in a printing job ticket so as to include at least a property used by an equipment and to save a property not used by the equipment, before the printing job ticket is transmitted to the equipment, in a process included in a printing workflow using the printing job ticket; and
    transmit a printing job ticket from which the saved property is excluded, to the equipment,
    wherein the processor performs editing for including the saved property in the printing job ticket, on the equipment that uses the saved property.

2. The information processing apparatus according to claim 1,
    wherein the processor detects the property which is used by the equipment.

3. The information processing apparatus according to claim 2,
    wherein the processor performs editing in accordance with the detected property.

4. The information processing apparatus according to claim 1,
    wherein the processor is included in a processing apparatus which controls the printing workflow.

5. The information processing apparatus according to claim 4,
    wherein the processing apparatus is a management information system, and
    wherein processing performed by the processor is performed as processing based on the control of the printing workflow.

6. The information processing apparatus according to claim 1,
    wherein the processor is included in a processing apparatus which is separate from a processing apparatus which controls the printing workflow.

7. The information processing apparatus according to claim 6,
    wherein the processing apparatus is a management information system, and
    wherein processing performed by the processor is performed as processing different from the control of the printing workflow.

8. The information processing apparatus according to claim 1,
    wherein, when the properties included in the printing job ticket are changed by a first equipment that sent the printing job ticket, the processor reflects the changed properties in the printing job ticket sent to a second equipment after the change.

9. A non-transitory computer readable medium storing an information processing program causing a computer to function as:
    an editing unit that edits properties included in a printing job ticket so as to include at least a property used by an equipment and to save a property not used by the equipment, before the printing job ticket is transmitted to the equipment, in a process included in a printing workflow using the printing job ticket; and
    a transmission unit that transmits a printing job ticket from which the saved property is excluded, to the equipment,
    wherein the editing unit performs editing for including the saved property in the printing job ticket, on the equipment that uses the saved property.

10. An information processing method comprising:
    editing properties included in a printing job ticket so as to include at least a property used by an equipment and to save a property not used by the equipment, before the printing job ticket is transmitted to the equipment, in a process included in a printing workflow using the printing job ticket;
    transmitting a printing job ticket from which the saved property is excluded, to the equipment; and
    editing for including the saved property in the printing job ticket, on the equipment that uses the saved property.

* * * * *